Aug. 19, 1941.    R. WEINGAND ET AL    2,253,157
PROCESS FOR PRODUCING CELLULOSE SHEETS AND FILMS
Filed July 26, 1935
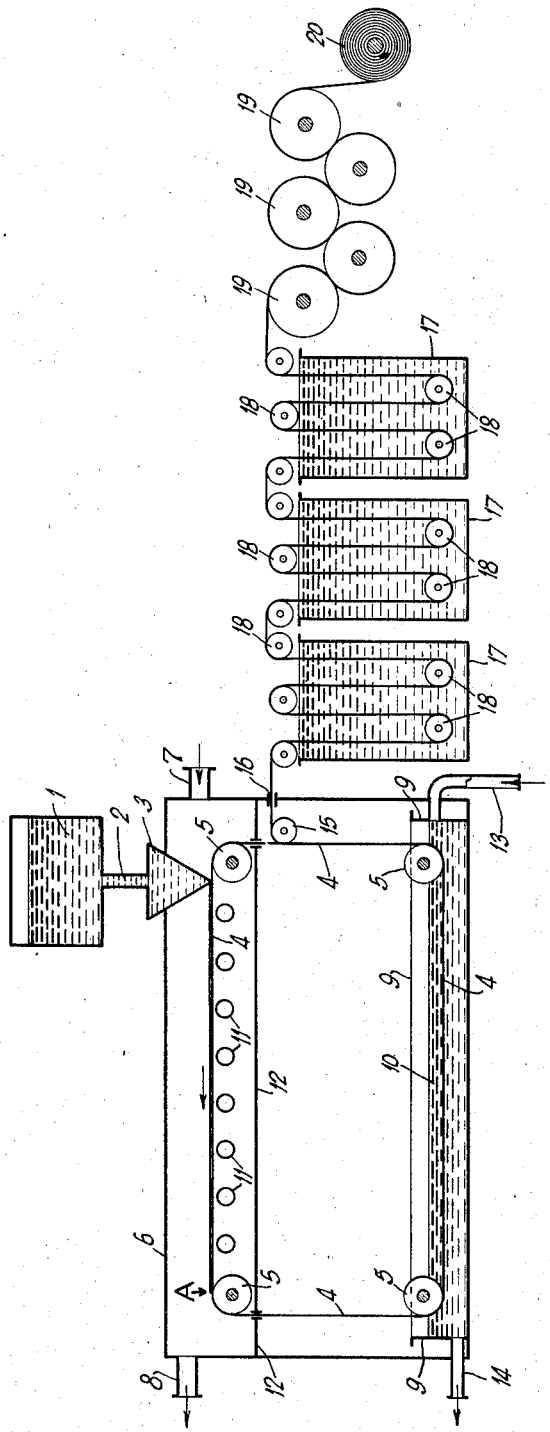
INVENTORS
Richard Weingand
Irene Koberne
BY Watson, Bristol, Johnson & Leavenworth
ATTORNEYS Patented Aug. 19, 1941

2,253,157

UNITED STATES PATENT OFFICE 2,253,157

PROCESS FOR PRODUCING CELLULOSE SHEETS AND FILMS

Richard Weingand and Irene Koberne, Bomlitz, near Walsrode, Germany, assignors to Sylvania Industrial Corporation, Fredericksburg, Va., a corporation of Virginia Application July 26, 1935, Serial No. 33,244
In Germany June 16, 1934

7 Claims. (Cl. 18—57)

The invention relates in general to sheets and films of cellulose formate and in particular to an improved process for producing sheets and films of cellulose formate, and to correlated improvements designed to improve the character of such sheets and films.

Heretofore it has been proposed to produce sheets and films of cellulose formate by casting a solution of pre-precipitated cellulose formate. According to such practice, cellulose is first formylized with strong formic acid in the presence of catalysts and/or dehydrating agents. From this formylizing mixture, the cellulose formate is precipitated in an amorphous state by the addition of water and the precipitate washed to remove the catalysts and dehydrating agents. The purified cellulose formate is brought again into solution by means of a suitable organic solvent. This second solution is then cast in the form of a sheet or film from which the organic solvent is evaporated at an elevated temperature as in the manufacture of sheets of cellulose acetate. This process is roundabout and expensive and considerable time is required to precipitate, wash and redissolve the cellulose formate and a considerable amount of the organic solvent is lost in drying the sheet.

It has also been proposed to form sheets and films directly from the original formylizing mixture comprising cellulose formate, catalyser and/or dehydrating agent and formic acid. According to this prior process, the original solution is cast into a thin layer and the solution coagulated immediately with water, after which the formic acid, catalysers and/or dehydrating agents are washed out of the product. The sheets and films thus produced are characterized by being opaque, inflexible and brittle and have no practical commercial value.

It is a general object of the invention to provide a process for the manufacture of sheets and films of cellulose formate in a simple and economical manner and without the use of expensive organic solvents.

It is another object of the invention to provide a process and apparatus for the production of transparent sheets and films of cellulose formate in a continuous manner directly from a formylizing mixture containing cellulose formate, formic acid, formylizing catalysts and/or dehydrating agents.

It is a further object of the invention to provide a process for the production of sheets and films of cellulose formate which are characterized by being transparent, strong and having a relatively high resistance to swelling in water.

It is a specific object of the invention to provide an improved method of removing formic acid from sheets and films cast from an aqueous solution of cellulose formate, formic acid, formylizing catalysts and/or dehydrating agents whereby to produce products which are perfectly transparent.

Other objects of the invention will in part be obvious and will in part appear hereinafter.

According to the invention, transparent sheets and films of cellulose formate are produced directly from the original formylizing solution containing cellulose formate, formic acid and formylizing accelerators such as catalysts and/or dehydrating agents, by casting this solution in the form of a thin layer, removing formic acid from this layer until the layer is substantially non-flowing, thereafter precipitating the cellulose formate in the layer to form a self-sustaining sheet or film, and washing the sheet or film to remove the residual formic acid and formylizing accelerators. The washed sheet or film of cellulose formate may be softened or otherwise treated and finally dried.

More particularly the evaporation of formic acid from the cast layer or solution is carried out by subjecting the layer simultaneously or successively to the action of steam and to a current of hot dry air, or preferably to a current of hot humidified air, until substantially all of the formic acid has been evaporated from the layer.

This process may be carried out by an apparatus comprising, in combination, a casting surface adapted to be moved in a closed path, means for casting upon such surface a thin layer of a cellulose formate solution, means to heat the layer of solution in one part of the path travelled by the casting surface, whereby formic acid is evaporated from the layer, and means for contacting the casting surface with a body of liquid in a subsequent part of its path, the path comprising a liquid which serves to precipitate the cellulose formate. There may also be provided means for stripping the sheet from the casting surface, means for washing the precipitated film and means for drying it, such, for example, as a plurality of heated rollers.

The invention accordingly comprises a process having the steps and the relation of steps one to another, as exemplified in the following detailed description, and the scope of the application of which is indicated in the claims.

For a more complete understanding of the nature and objects of the invention, reference should be had to the accompanying drawing in which the figure designates one embodiment of the novel apparatus for producing sheets and films of cellulose formate, in accordance with the invention.

The process of the invention may be carried out with any suitable formic acid solution of cellulose formate such as that resulting from the formylization of cellulose. For example, a suitable solution may be prepared by kneading 50 kilograms of cellulose in the form of cotton linters or a refined cellulose, and thoroughly mixing this with 700 kilograms of a 30% solution of zinc chloride dissolved in concentrated formic acid, care being taken that the temperature of the mixture does not exceed 35° C. The homogeneous solution thus obtained is allowed to ripen for about four days at room temperature whereby the viscosity is reduced and the solution deaerated at the same time.

It is preferable to use solutions having a maximum content of cellulose formate and a minimum content of formic acid to decrease the amount of formic acid which must be recovered. A solution having a viscosity determined by the falling ball method of 400 seconds is suitable for use in the process of the invention. In order to deaerate such a viscous solution, the solution is placed under pressure with which procedure solutions having a cellulose content of up to 10% can be deaerated in a few hours without any material decomposition of the cellulose formate.

Referring to the figure, there is shown one embodiment of an apparatus suitable for carrying out the process of the invention in which there is provided a tank 1 connected by a conduit 2 to a hopper 3 provided at its bottom with a slit-shaped orifice extending the full width of the hopper. Below the orifice there is positioned an endless flexible conveyor band 4 which moves in a closed circuit over suitable rollers 5 and in the direction indicated by the arrows. The conveyor band and its supporting rollers are preferably enclosed in a chamber 6 provided with an inlet port 7 and an outlet port 8. These ports are positioned in the upper part of the chamber so that a current of air passing through said chamber will flow in a direction concurrent with the band 4, although the air may be caused to flow countercurrent to the band, if desired.

There also is provided in the upper part of the chamber means for heating the band 4 and/or the air such, for example, as a plurality of steam pipes 11 which may be positioned below the band and/or above the band. The lower part of the chamber may form a vat 9 for disposing a bath 10 of a liquid so that the band passes into contact with the liquid in one part of its circuit. If desired, a partition 12 may be disposed between the heating pipes 11 and the bath 10 to avoid heating the bath. There is provided a conduit 13 for supplying liquid to the vat 9 and a conduit 14 for removing liquid therefrom, the conduits 13 and 14 being so disposed that the liquid flows countercurrent with the band 4. A stripping roller 15 is disposed transverse of the band and a short distance from the extrusion nozzle. An aperture 16 is provided in the chamber wall adjacent the roller 15.

In connection with the casting chamber, there is provided a plurality of vats 17 adapted to contain treating baths and having suitable rollers 18 for conveying the film therethrough. In series with the vats 17, there is also provided means for drying the film such, for example, as a plurality of drying rollers 19 over which the film passes to the wind-up roller 20.

In carrying out the process of the invention, the solution of cellulose formate in the storage tank 1 is conveyed through the conduit 2 to the hopper 3 from which it is cast in the form of a thin layer onto the conveyor band 4. The layer, while being carried in a horizontal plane as shown in the drawing, is passed through the heating zone provided by the steam pipes 11 whereby formic acid is evaporated from the layer and the layer is coagulated to a degree such that the solution is non-flowing when it has reached the point A in the chamber. The mixture of evaporated formic acid and air is removed from the chamber through the conduit 8 and passed to a condenser from which the liquefied formic acid may be removed and reused in preparing the cellulose formate solutions.

The dried layer, freed of the major part of the formic acid, is carried by the conveyor band 4 into the precipitated bath 10 which comprises a suitable precipitant of cellulose formate such, for example, as water. In this bath, the residual formic acid and the formylizing accelerators, such as the catalysts and/or dehydrating agents, are washed out of the film. Further, in this bath, the film is completely precipitated and rendered self-sustaining.

The film of cellulose formate, is stripped from the conveyor band by passing the film over the roller 15. The film is conveyed next over the rollers 18 through the vats 17 which may contain suitable solutions for further washing and/or softening the film.

In order to shorten the time required for the precipitation of the cellulose formate, the precipitating bath is maintained preferably at an elevated temperature, such as 40° C. Fresh water is continuously introduced into the bath through the conduit 13 so that the bath 10 does not become concentrated with the substances washed out of the film. It is advisable to have the washing liquid flow in a direction opposite to that in which the film is moving in order that the formic acid catalysts and/or dehydrating agents used in the process may be removed in as concentrated form as possible. From the softening bath, the film is now passed over the heated drying rollers 19 and then wound up upon the supply roller 20.

A plasticizer may be incorporated in the sheet or film in the initial formic acid solution, but preferably the film is softened just prior to or during the drying of the film, for example, by adding 15%–20% of a plasticizer to the last washing bath in the series of vats 17 above described.

In order to obtain perfectly transparent sheets and films the major portion, preferably about 75%, of the formic acid is evaporated from the cast solution before the layer passes into the precipitating bath. Evaporation of the formic acid from the layer of solution may be effected by heating the surface upon which the layer is cast and/or by subjecting the layer of solution to the action of a current of hot air. In order to prevent the formation of a superficial film on the layer which would retard the evaporation of formic acid from within the body of the layer, it is desirable to retard the evaporation of the formic acid from the surface of the layer while promoting the escape of formic acid from within the body of the layer. This retardation can be accomplished for example, by subjecting the layer of solution to the action of the vapor of a solvent for formic acid so as to dilute the formic acid on the surface of the solution.

In the now preferred practice of the invention, the layer of solution, immediately after extrusion, is subjected to the action of steam so as to form on the surface of the layer an exceedingly thin superficial deposit of water, the amount of water being insufficient to produce precipitation of the cellulose formate in the layer. The treated layer is subjected to the action of heat to evaporate the formic acid from the body of the layer of solution to produce a dried, non-flaming film. The treatment of the layer by the action of steam and heat may be simultaneous, as by passing a current of hot humidified air over the layer, or stepwise, as by subjecting the layer first to the action of steam and then to the action of a current of hot, dry air. About 75% of the formic acid contained in the layer of solution may be evaporated by subjecting the layer to a steam treatment for a few seconds and thereafter to a current of dry air heated to 70° C. for from 2 to 10 times longer than the steam treatment, the layer thus being rendered non-flowing in sufficient time for continuous, commercial production of sheets and films.

The invention also contemplates the formation of sheets or films from cellulose formate which contains some free hydroxyl groups. For example, there may be produced a cellulose formate containing from 40% to 45% of formic acid which, when formed into sheets or films according to the process of this invention, will produce a product which has the novel properties of swelling in water only to a slight degree, for example, to about 10% of that to which a sheet of cellulose hydrate will swell.

The cellulose formate sheets and films produced by the process of the invention are characterized by being perfectly transparent, flexible and strong. Compared with cellulose hydrate sheets, the cellulose formate sheets swell in water only to a very slight degree and are relatively non-hygroscopic, hence they show little variation in volume. The cellulose formate sheets have an appreciably higher resistance to the diffusion of water vapor than sheets of uncoated cellulose hydrate. When sheets of cellulose formate are cut into special shapes, the waste material may be easily dissolved in formic acid to form a solution adapted for the production of various products. Moreover, since the degree of shrinkage of the cellulose formate sheets in the course of manufacture is less than that of cellulose hydrate sheets, it is possible to make the apparatus somewhat smaller than is required to produce a sheet of cellulose hydrate of the same width.

We claim:

1. A process for producing transparent sheets and films of cellulose formate, which comprises forming a layer of a solution of cellulose formate in formic acid, subjecting the layer to the action of water vapor and hot air to evaporate formic acid from said layer until the layer is non-flowing, the amount of water vapor to which the layer is subjected being sufficient to form a thin superficial deposit of water on the surface of the layer and the amount of water so deposited being insufficient to precipitate cellulose formate, and thereafter precipitating the cellulose formate in said layer.

2. A process for producing transparent sheets and films of cellulose formate, which comprises forming a layer of a solution of cellulose formate in formic acid, subjecting the layer to currents of steam and hot air to evaporate formic acid from said layer until the layer is non-flowing, the amount of steam to which the layer is subjected being sufficient to form a thin superficial deposit of water on the surface of the layer and the amount of water so deposited being insufficient to precipitate cellulose formate, and thereafter precipitating the cellulose formate in said layer.

3. A process for producing transparent sheets and films of cellulose formate, which comprises forming a layer of a solution of cellulose formate in formic acid, subjecting the layer to a current of hot gas comprising a mixture of steam and air to evaporate formic acid from said layer until the layer is non-flowing, the amount of steam to which the layer is subjected being sufficient to form a thin superficial deposit of water on the surface of the layer and the amount of water so deposited being insufficient to precipitate cellulose formate, and thereafter precipitating the cellulose formate in said layer.

4. A process for producing transparent sheets and films of cellulose formate, which comprises forming a layer of a solution of cellulose formate in formic acid, subjecting the layer to a current of hot gas comprising a mixture of steam and air to evaporate about 75% of the formic acid from said layer until the layer is non-flowing, the amount of steam to which the layer is subjected being sufficient to form a thin superficial deposit of water on the surface of the layer and the amount of water so deposited being insufficient to precipitate cellulose formate, and thereafter precipitating the cellulose formate in said layer.

5. A process for producing transparent sheets and films of cellulose formate, which comprises forming a layer of a solution of cellulose formate in formic acid, subjecting the layer to a current of hot gas comprising a mixture of steam and air to evaporate formic acid from said layer until the layer is non-flowing, the amount of steam to which the layer is subjected being sufficient to form a thin superficial deposit of water on the surface of the layer and the amount of water so deposited being insufficient to precipitate cellulose formate, and thereafter precipitating the cellulose formate in said layer by passage through an aqueous medium at a temperature of about 40° C.

6. A process for producing transparent sheets and films of cellulose formate, which comprises forming a layer of a solution of cellulose formate in formic acid, subjecting the layer to a current of hot gas comprising a mixture of steam and air to evaporate about 75% of formic acid from said layer until the layer is non-flowing, the amount of steam to which the layer is subjected being sufficient to form a thin superficial deposit of water on the surface of the layer and the amount of water so deposited being insufficient to precipitate cellulose formate, and thereafter precipitating the cellulose formate in said layer by passage through an aqueous medium at a temperature of about 40° C.

7. A process for producing transparent sheets and films of cellulose formate, which comprises forming a layer of a solution of cellulose formate in formic acid, subjecting the layer to the action of a condensible vapor of a substance which is a solvent for formic acid and a precipitant of cellulose formate and hot air whereby formation of a superficial skin on said layer is prevented, the amount of solvent vapor to which the layer is subjected being in an amount sufficient to enable it to condense into a thin superficial deposit of liquid solvent upon the surface of the layer and the amount of such liquid being insufficient to precipitate cellulose formate, evaporating formic acid thereby from said layer until the layer is non-flowing, and thereafter precipitating the cellulose formate in said layer.

RICHARD WEINGAND.
IRENE KOBERNE.